Oct. 19, 1943.  W. E. McDONELL  2,332,160
OPHTHALMIC MOUNTING
Filed Sept. 20, 1940
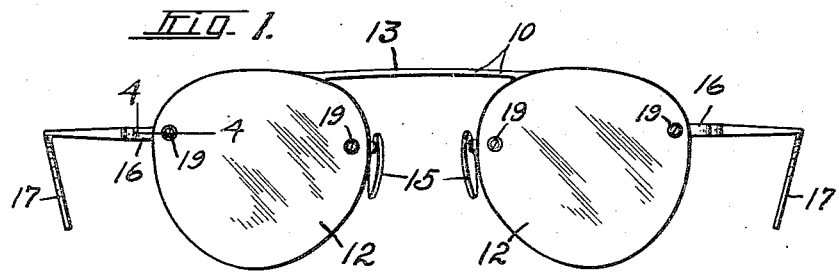
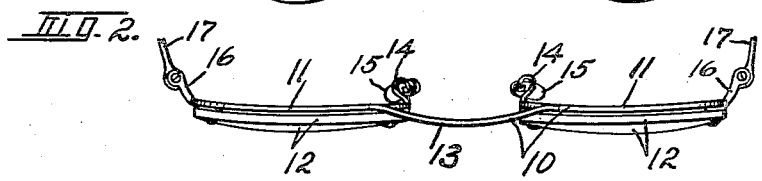
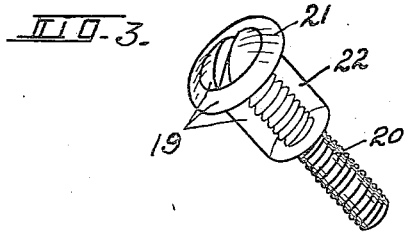
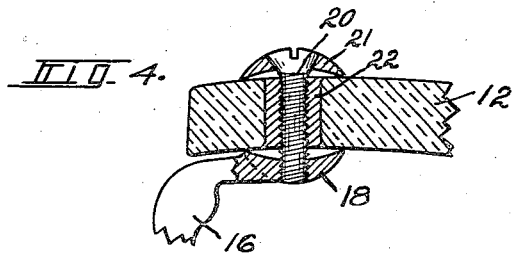
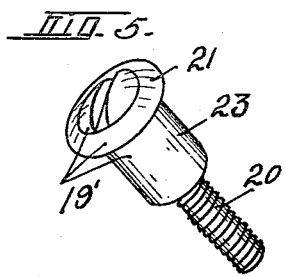
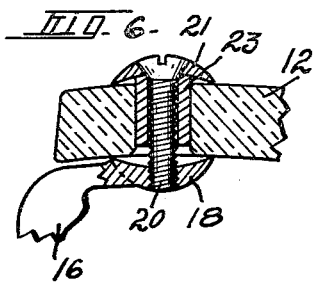
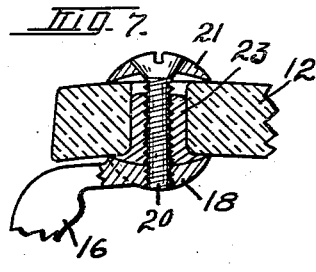
INVENTOR
*William E. McDonell*
BY *Theodore L. Simonton*
ATTORNEY Patented Oct. 19, 1943

2,332,160

UNITED STATES PATENT OFFICE 2,332,160

OPHTHALMIC MOUNTING

William E. McDonell, Rochester, N. Y., assignor to Shuron Optical Company, Inc., Geneva, N. Y., a corporation of New York Application September 20, 1940, Serial No. 357,622

7 Claims. (Cl. 88—41)

This invention relates to ophthalmic mountings, and relates more particularly to improvements in semi-rimless ophthalmic mountings of the type in which each lens is supported from a top arm by screws threaded into two spaced lugs bearing on the rear surface of the lens and secured to the top arm.

The semi-rimless mountings of the type above described possess a number of advantages over ordinary rimless mountings and over many types of semi-rimless mountings. Some of these advantages may be summarized as follows: (1) The strength of a frame mounting is combined with the inconspicuous appearance of a rimless mounting; (2) each lens is suspended from two spaced lugs on the metal top arm, which carries all the handling strain, so that the lens does not support anything but itself; (3) the screw and lug fastening of the lens to the top arm, eliminating the usual straps, simplifies the mounting of lenses of varying thickness, and makes the thickness of the lens no obstacle to convenience of assembly; (4) the usual strap and consequent adjustment of the strap shoe and ears by means of pliers to conform to the lens are eliminated.

Despite these and other advantages, mountings of the type described were not commercially exploited prior to the making of the present invention, for the reason that such a mounting required great accuracy of drilling of the lenses and there was a decided tendency for the lenses to work loose so that they would wobble on the supporting top arms. In an attempt to overcome these disadvantages, the use of a resilient washer under the head of the lens mounting screw has been suggested, but this is not a permanent and satisfactory solution of the problem.

The objects of the present invention are to overcome the above recited disadvantages of such a construction, and to provide a simple and practical means of assembling lenses to a mounting of the type described, whereby with ordinary care in drilling the lens holes, a firm, secure and cushioned assembly of the lenses to the mounting is obtained, which is practically shock-proof and substantially eliminates strain on the lenses.

Other objects and advantages of my invention will be apparent from the following description, taken in conjunction with the accompanying drawing in which:

Figure 1 is a front elevation of a pair of spectacles embodying my invention, the ends of the temples being broken away.

Figure 2 is a top plan view of the spectacles of Figure 1, the ends of the temples being likewise broken away.

Figure 3 is a perspective view on an enlarged scale of a lens securing unit comprising a screw, washer and deformable plastic bushing.

Figure 4 is an enlarged detail sectional view taken on the line 4—4 of Figure 1, and showing the lens securing unit of Figure 3 in place in the finished mounting.

Figure 5 is a perspective view of a modified form of lens securing unit comprising a screw, washer and deformable soft solder bushing.

Figure 6 is a view similar to Figure 4 but showing the lens securing unit of Figure 5 in an intermediate stage of assembly.

Figure 7 is a view similar to Figure 6 showing the parts in their final position of assembly.

Referring more particularly to the drawing, the ophthalmic mounting 10 shown in Figures 1 and 2 comprises a pair of metal top arms 11, arranged immediately behind and along the top rim of the lenses 12. The top arms 11 are connected by a bridge 13, which may be of any convenient or desired type, but is here shown as being of the so-called brow-line construction. To the inner ends of the top arms 11 are secured pad arms 14 carrying pads 15, both of which may be of any usual or desired construction, and to the outer ends of the top arms 11 are secured end pieces 16 to which are pivoted the usual temples 17. Two lens supporting lugs 18, shown more particularly in Figure 4, are likewise secured to the ends of each top arm 11, preferably adjacent the points of securing the respective end pieces 16 and pad arms 14 thereto, and, if desired, the lens supporting lugs 18 may conveniently be formed integral with the end pieces and pad arms.

As will be understood by those skilled in this art, the metal frames are supplied by the manufacturer to opticians and other dispensers who prepare the lenses and assemble them to the frame. As part of this assembly operation, the dispenser drills holes in the lenses at appropriate points.

According to the present invention, I employ four lens securing units 19 for attaching the lenses 12 to the lugs 18. Each of these units 19 consists of a lens screw, a washer under the head of the screw, and a deformable bushing surrounding the screw and adapted to compensate for any normal variations and minor inaccuracies in the drilling of the lens holes by the dispenser.

Figure 3 shows in perspective on an enlarged scale one embodiment of a lens securing unit 19 according to my invention, which consists of a screw 20, washer 21 and deformable plastic bushing 22. The latter is illustrated as being transparent, although this is by no means essential. The plastic chosen should be one which is capable of deformation under the conditions of use. I have successfully used for this purpose zylonite, which may readily be softened and rendered deformable to the desired extent by moistening it with acetone or other suitable solvent. It will be appreciated, however, that there are many other plastics available on the market that would be equally suitable. As shown in Figure 3, the bushing 22 is considerably larger in diameter and considerably shorter than the screw 20. The length of the bushing 22 should be no greater, and may be substantially less, than the thickness of the lens with which it is to be used.

According to my invention, the lens securing units 19 are intended to be supplied by the mounting manufacturer completely assembled as shown in Figure 3. The dispenser drills the lenses at spaced points corresponding to the spacing of the tapped holes in the lugs 18, making the holes large enough in diameter to accommodate the bushings 22. The dispenser then applies a drop of a suitable solvent to each bushing 22, inserts the units 19 in the lens holes, and thereafter threads the screws 20 into the tapped openings in the lugs 18. By this method of assembly, the lenses 12 may be easily attached to the mounting 10 even though there has been considerable inaccuracy in drilling the lens holes. As the screws 20 are tightened, the lenses 12 are clamped between the respective washers 21 and lugs 18. In order to relieve any possible strain on the edges of the lens holes, I make the opposed surfaces of the washers 21 and lugs 18 concave in shape as clearly shown in Figure 4. By so doing, the clamping pressure is distributed over the surfaces of the lenses. At the same time, this curved construction of the washers and lugs tends to cause the screws 20 to assume positions normal to the medial plane of the lens and spaced to conform to the spacing of the lugs 18. If there has been any inaccuracy in the drilling of the lens holes, the resultant pressure on the bushings 22 tends to deform them to compensate for the errors and relieve the lenses of strain.

It will thus be observed that a mounting according to my invention requires less skill and care of a dispenser and will ensure a tight workmanlike product despite unavoidable variations or even fairly substantial errors in his work. And whether the drilling of the lens holes be perfect or not, the bushing 22 tends to prevent the screw 20 from working loose in service and provides a shock-absorbing coupling between the lens and the frame.

It will of course be understood that after the assembly of the lenses to the mounting is completed, the ends of the screws 20 are cut off flush with the outer surfaces of the lugs 18 as illustrated in Figure 4, and suitably finished in the usual manner.

In Figure 5 I have illustrated a modified form of a lens securing unit 19' according to my invention. This unit comprises a screw 20 and washer 21 as before, but instead of a plastic bushing, employs a bushing 23 of soft solder or other suitable easily fusible material. The assembly of the lenses to the mounting 10 is accomplished by means of the unit 19' in exactly the same manner as with the unit 19 of Figure 3, except that it is of course not necessary to moisten the bushing 23 with a plastic solvent, and instead it is desirable to place a small amount of a suitable liquid flux in the threads of the lugs 18. After such assembly, the parts will be in the condition illustrated in Figure 6. The bushing 23 is then heated sufficiently to melt it, whereupon it will adapt itself to the pressure produced by any eccentricity of the screw 20 in the lens hole, thus relieving any resulting strain on the lens, and may assume the general shape and position shown in Figure 7. Upon cooling, the fusible material will solidify and lock the various parts together. The fusing of the bushing 23 may conveniently be accomplished by passing an electric current through the unit 19', using one of the electric devices commonly employed in the optical industry for operations of this character. It will be understood that a similar fusing operation should be performed should it be desired later to disassemble the mounting, the screw 20 being threaded out of the lug 18 while the fusible material is soft.

Since the requirements of the bushing 23 are merely that it be capable of being softened and rendered easily deformable by the application of moderate heat, it will be evident that a suitable thermoplastic material could be employed in lieu of soft solder or the like. The term "thermoplastic material" is intended to include either a material capable of being merely softened or one capable of being fused by the application of moderate heat.

Although I have specifically described the best ways known to me for carrying my invention into effect, it will be appreciated that various changes and modifications may be made by those skilled in this art without departing from the spirit of my invention, and I desire to be limited, therefore, only by the prior art and the scope of the appended claims.

I claim:

1. A semi-rimless opthalmic mounting of the type having a bridge, a pair of top arms affixed to said bridge to extend outwardly along the top rims of a pair of lenses, and temples hinged to endpieces affixed to said top arms, comprising in combination, a pair of lens supports for each of said lenses, one of each pair of lens supports being affixed to said mounting at the temporal side of the lens and the other of each pair of lens supports being affixed to said mounting at the nasal side of the lens, said lens supports comprising a lug constructed to bear on the rear surface of the lens only and to engage said rear surface only adjacent the periphery of the lug, a lens screw passing from the front of the lens through a hole provided therein and threaded into an aperture provided in said lug, said lens hole being of appreciably larger diameter than the stem of said screw, a rigid washer of substantially larger diameter than the screw head mounted on said screw between the head thereof and the lens, said washer being constructed to bear on the front surface of the lens only and to engage said front surface only adjacent the periphery of the washer, said lens being clamped by the lens screw between the opposed peripheries of the associated washer and lug, whereby the clamping pressure is distributed over the side surface of the lens and the lens screw tends to assume a position substantially normal to the medial plane of the lens, and a deformable bushing mounted on the stem of said screw and substantially contained within said lens hole, said bushing being deformed for fixedly securing the screw in the lens hole without play therebetween and without lateral strain in the lens adjacent the wall of the lens hole.

2. The combination as claimed in claim 1 in which said lug and said washer have concave lens-engaging surfaces.

3. The combination as claimed in claim 1 in which the deformable bushing is made of soft solder.

4. A semi-rimless ophthalmic mounting comprising a bridge, a pair of top arms affixed to said bridge to extend outwardly along the top rims of a pair of lenses, a pair of lens supporting lugs affixed to each of said top arms near the ends thereof, each of said lugs being constructed to bear on the rear surface of the lens only and to engage said rear surface only adjacent the periphery of the lug, lens screws passing from the front of the lenses through holes provided therein and threaded into apertures provided in said lugs, said lens holes being of appreciably larger diameter than the stems of said screws, a rigid washer of substantially larger diameter than the screw head mounted on each screw between the head thereof and the lens, each of said washers being constructed to bear on the front surface of the lens only and to engage said front surface only adjacent the periphery of the washer, said lenses being clamped by the lens screws between the opposed peripheries of the associated washers and lugs, whereby the clamping pressure is distributed over the side surfaces of the lenses and the lens screws tend to assume positions substantially normal to the medial planes of the lenses, and a deformable bushing mounted on the stem of each screw and substantially contained within its lens hole, each of said bushings being deformed for fixedly securing the screw in the lens hole without play therebetween and without lateral strain in the lens adjacent the wall of the lens hole.

5. The combination as claimed in claim 4 in which the deformable bushings are made of soft solder.

6. A semi-rimless ophthalmic mounting comprising a bridge, a pair of top arms affixed to said bridge to extend outwardly along the top rims of a pair of lenses, a pair of lens supporting lugs affixed to each of said top arms near the ends thereof, said lugs being constructed to bear on the rear surfaces of said lenses only and having concave lens-engaging surfaces, lens screws passing from the front of the lenses through holes provided therein and threaded into apertures provided in said lugs, said lens holes being of appreciably larger diameter than the stems of said screws, a rigid washer of substantially larger diameter than the screw head mounted on each screw between the head thereof and the lens, each of said washers having a concave lens-engaging surface, said lenses being clamped by the lens screws between the opposed concave surfaces of the associated washers and lugs, whereby the clamping pressure is distributed over the side surfaces of the lenses and the lens screws tend to assume positions substantially normal to the medial planes of the lenses, and a deformable bushing mounted on the stem of each screw and substantially contained within its lens hole, each of said bushings being deformed for fixedly securing the screw in the lens hole without play therebetween and without lateral strain in the lens adjacent the wall of the lens hole.

7. The combination as claimed in claim 6 in which the deformable bushings are made of soft solder.

WILLIAM E. McDONELL.